US006113336A

United States Patent [19]

Chang et al.

[11] Patent Number: 6,113,336

[45] Date of Patent: Sep. 5, 2000

[54] WAREHOUSING SYSTEM HAVING A CONVEYING DEVICE FOR TRANSFERRING ARTICLES BETWEEN TWO LEVELS OF A MULTISTORY BUILDING

[76] Inventors: Tien-Sheng Chang, No. 69, Lane Yung-Chun, Yen-Ho St., Lin-Lo Hsiang, Pingtung Hsien; Yu-An Hhieh, No. 15, Lane 52, Tasi-Kung-I Rd., Tso-Ying Dist., Kaohsiung City; Chung-Hsin Yang, 10F, No. 2-4, Lane 56, Wu-Ching-Erh Rd., Fengshan City, Kaohsiung Hsien, all of Taiwan

[21] Appl. No.: 09/413,714

[22] Filed: Oct. 5, 1999

[51] Int. Cl.[7] .............................. B65G 1/04; B65G 37/00

[52] U.S. Cl. ............................................ 414/281; 414/282

[58] Field of Search .................................... 414/281, 282, 414/246

[56] References Cited

U.S. PATENT DOCUMENTS

| | | | |
|---|---|---|---|
| 3,033,392 | 5/1962 | Baumann et al. | 414/261 |
| 3,387,724 | 6/1968 | Armington | 414/282 |
| 3,779,403 | 12/1973 | Young | 414/281 X |

*Primary Examiner*—Steven A. Bratlie

*Attorney, Agent, or Firm*—Christensen O'Connor; Johnson & Kindness, PLLC

[57] ABSTRACT

A warehousing system includes a multistory building having at least one lower floor, at least one upper floor located above the lower floor, opposed pairs of rack members disposed on the upper floor, and an aisle formed between each of the pairs of the rack members. Each pair of the rack members has two opposed horizontal guide rails respectively formed thereon at two sides of the aisle. A hole is formed in the upper floor at the aisle to intercommunicate respectively with the lower floor. A conveying device is disposed movably on the horizontal guide rails. The conveying device includes a translation device having a base bridging the aisle and connected slidably to the horizontal guide rails, a driving device disposed on the base for driving the base to move along the horizontal guide rails in a first direction, a holding apparatus mounted on the base and adapted for holding an article to be conveyed, and an elevator apparatus disposed on the base for raising and lowering the holding apparatus from the base. The elevator apparatus is movable relative to the base to lower the holding apparatus through the hole into the lower floor.

11 Claims, 18 Drawing Sheets

WAREHOUSING SYSTEM HAVING A CONVEYING DEVICE FOR TRANSFERRING ARTICLES BETWEEN TWO LEVELS OF A MULTISTORY BUILDING

BACKGROUND OF THE INVENTION

1. Field of the Invention

This invention relates to a warehousing system, more particularly to a warehousing system for transferring articles between two levels of a multistory building.

2. Description of the Related Art

It is well known that a conventional warehousing system comprises a building, a plurality of rack members stacked in the building, and a conveying device for transferring articles to and from the rack members. The conveying device has a holding mechanism, an elevator mechanism that cooperates with the holding mechanism, and transportation rails disposed on a floor of the building so that the holding mechanism can move thereon. Articles can be held by the holding mechanism and can be transferred to one of the rack members from an entrance of the building via the transportation rails. Then, the articles can be raised and lowered to a specific level of one of the rack members by the elevator mechanism.

Such a conventional warehousing system suffers from the following disadvantages:

1. The holding mechanism can not pick up the articles stored in different levels of the building.

2. When it is desired to convey the articles between two different levels, additional lifts or conveyors are required. Therefore, the storage space in the building is reduced due to the installation of the additional elevators or conveyors in the building.

3. The articles are transferred among the rack members via the transportation rails. As such, the available area on the floor of the building is limited.

SUMMARY OF THE INVENTION

The object of the present invention is to provide a warehousing system having a holding device that can pick up articles in two different levels of a multistory building.

Another object of the present invention is to provide a warehousing system that has an increased storage space and area as compared to the aforementioned conventional warehousing system.

According to the present invention, a warehousing system comprises a multistory building having at least one lower floor, at least one upper floor located above the lower floor, opposed pairs of rack members disposed on the upper floor, and an aisle formed between each of the pairs of the rack members. Each pair of the rack members has two opposed horizontal guide rails respectively formed thereon at two sides of the aisle. A hole is formed in the upper floor at the aisle to intercommunicate respectively with the lower floor. A conveying device is disposed movably on the horizontal guide rails. The conveying device includes a translation device having a base bridging the aisle and connected slidably to the horizontal guide rails, driving means disposed on the base for driving the base to move along the horizontal guide rails in a first direction, holding means mounted on the base and adapted for holding an article to be conveyed, and elevator means disposed on the base for raising and lowering the holding means from the base. The elevator means is movable relative to the base to lower the holding means through the hole into the lower floor.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
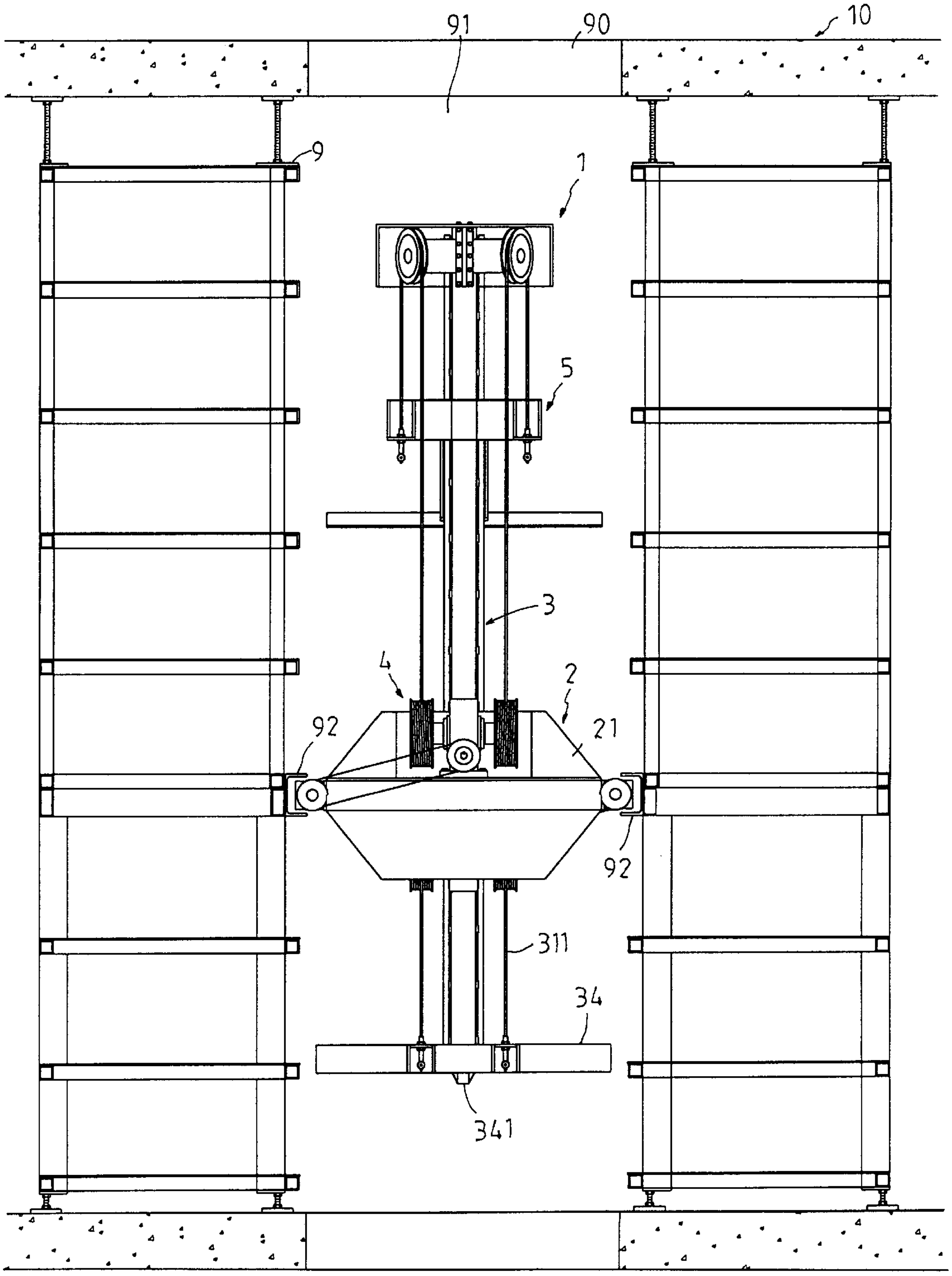
FIG. 1 is a fragmentary front view of a preferred embodiment of a warehousing system according to the present invention.

Referring to FIGS. 1, 2, 3 and 12, a preferred embodiment of a warehousing system according to the present invention is shown to comprise a multistory building 10 and a conveying device 1. The building 10 has a first floor 101, a second floor 102, a third floor 103, and opposed pairs of rack members 9 disposed on the first, second and third floors 101, 102, 103. An aisle 91 is formed between each pair of rack members 9. Two opposed horizontal guide rails 92 are respectively formed on one of the pairs of the rack members 9 on the second floor 102 at two sides of the aisle 91. The aisles 91 on the first, second and third floors 101, 102, 103 are aligned vertically with one another. Holes 90 are formed in the second and third floors 102, 103 to intercommunicate the aisles 91 in the first, second and third floors 101, 102, 103. The conveying device 1 is disposed movably on the horizontal guide rails 92 in the aisle 91. The conveying device 1 includes a translation device 2 that is connected slidably to the horizontal guide rails 92 to move in a first direction along the same, a first elevator device 3 mounted on and movable with respect to the translation device 2, a second elevator device 4 mounted on the translation device 2 and movable with respect to the first elevator device 3, and holding means 5 movable with the second elevator device 4 for holding an article to be conveyed.

Figure 2:
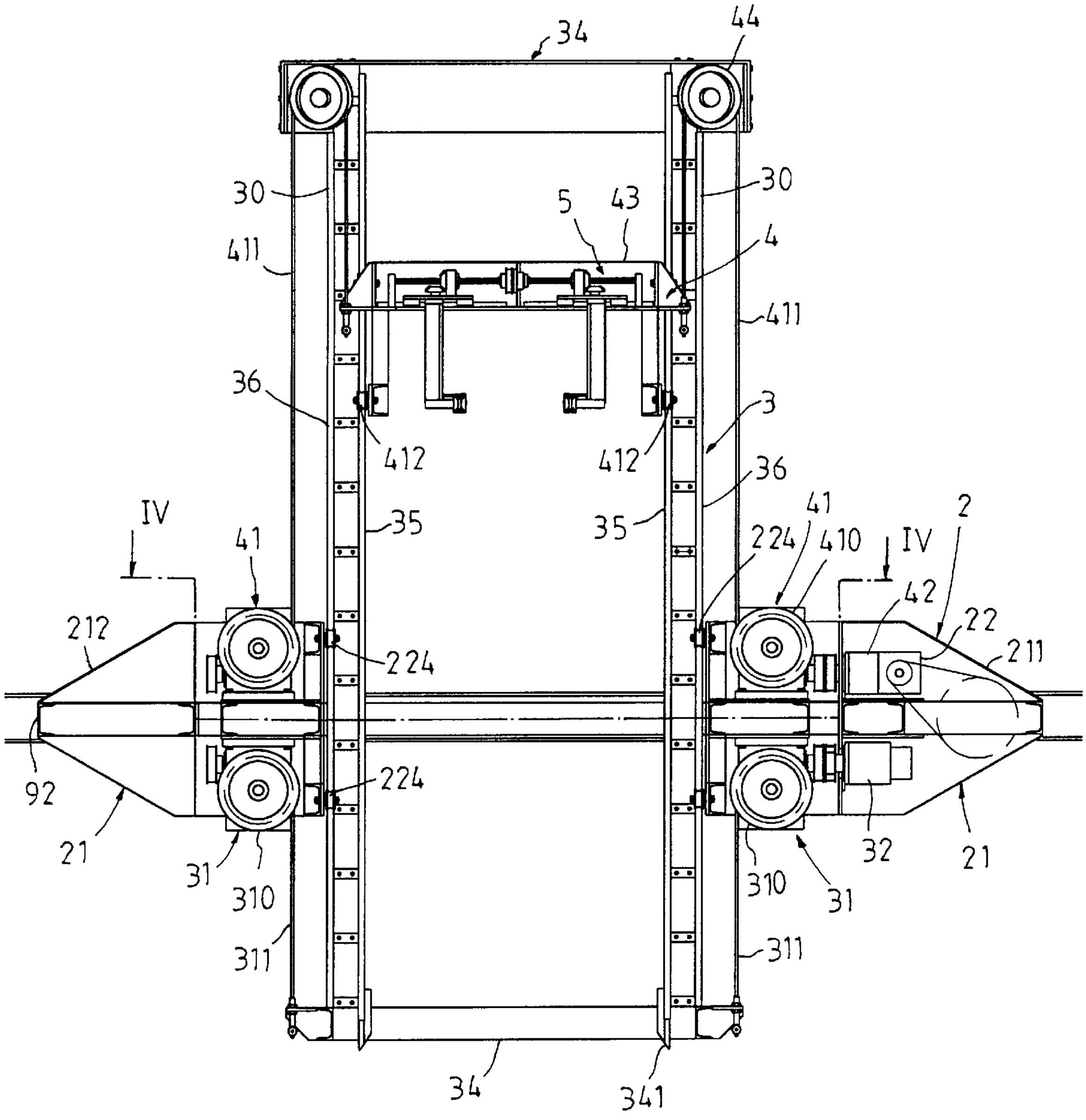
FIG. 2 is a fragmentary side view of the preferred embodiment of a warehousing system according to the present invention.
Figure 3:
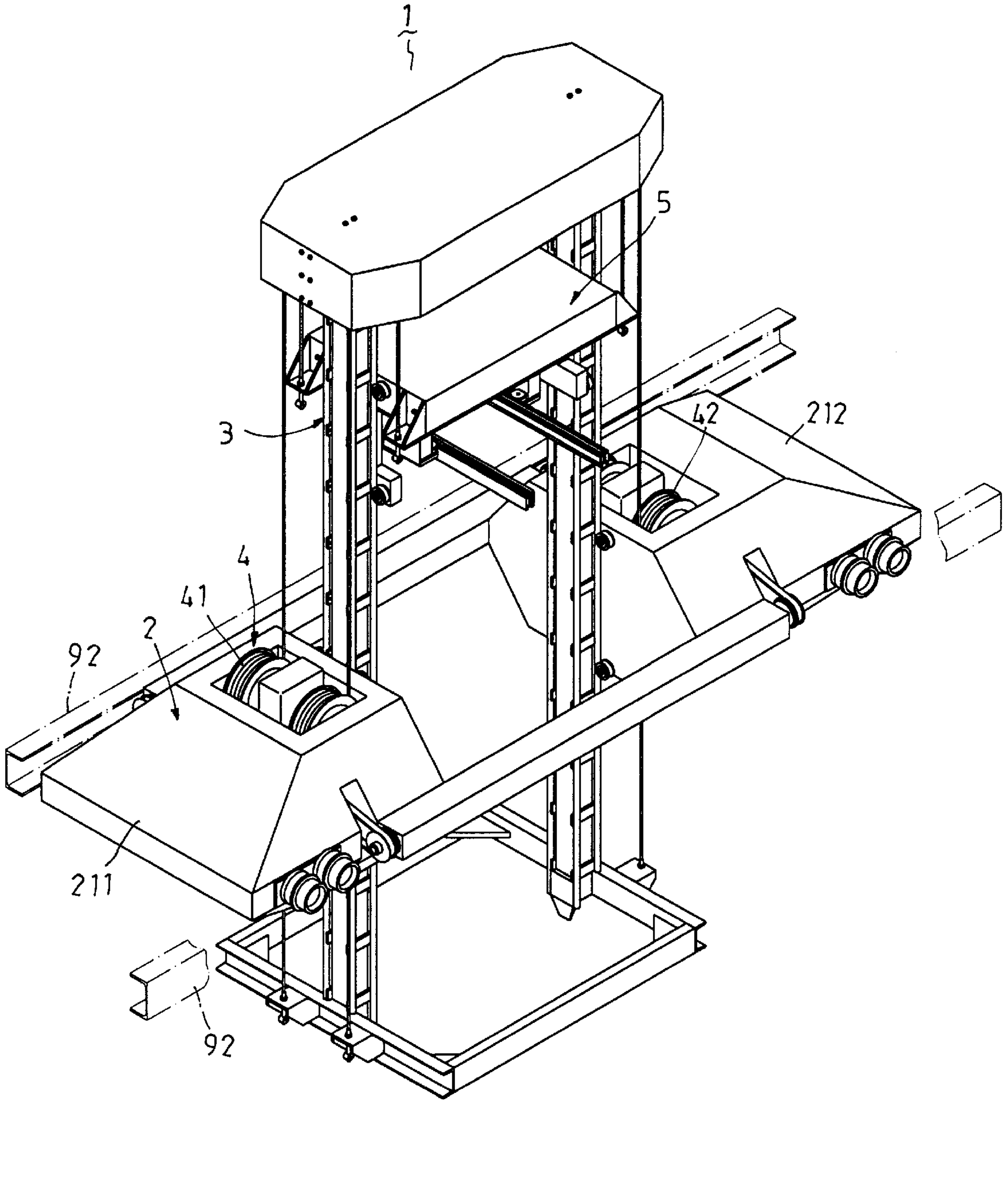
FIG. 3 is a perspective view of the preferred embodiment of the warehousing system according to the present invention.
Figure 4:
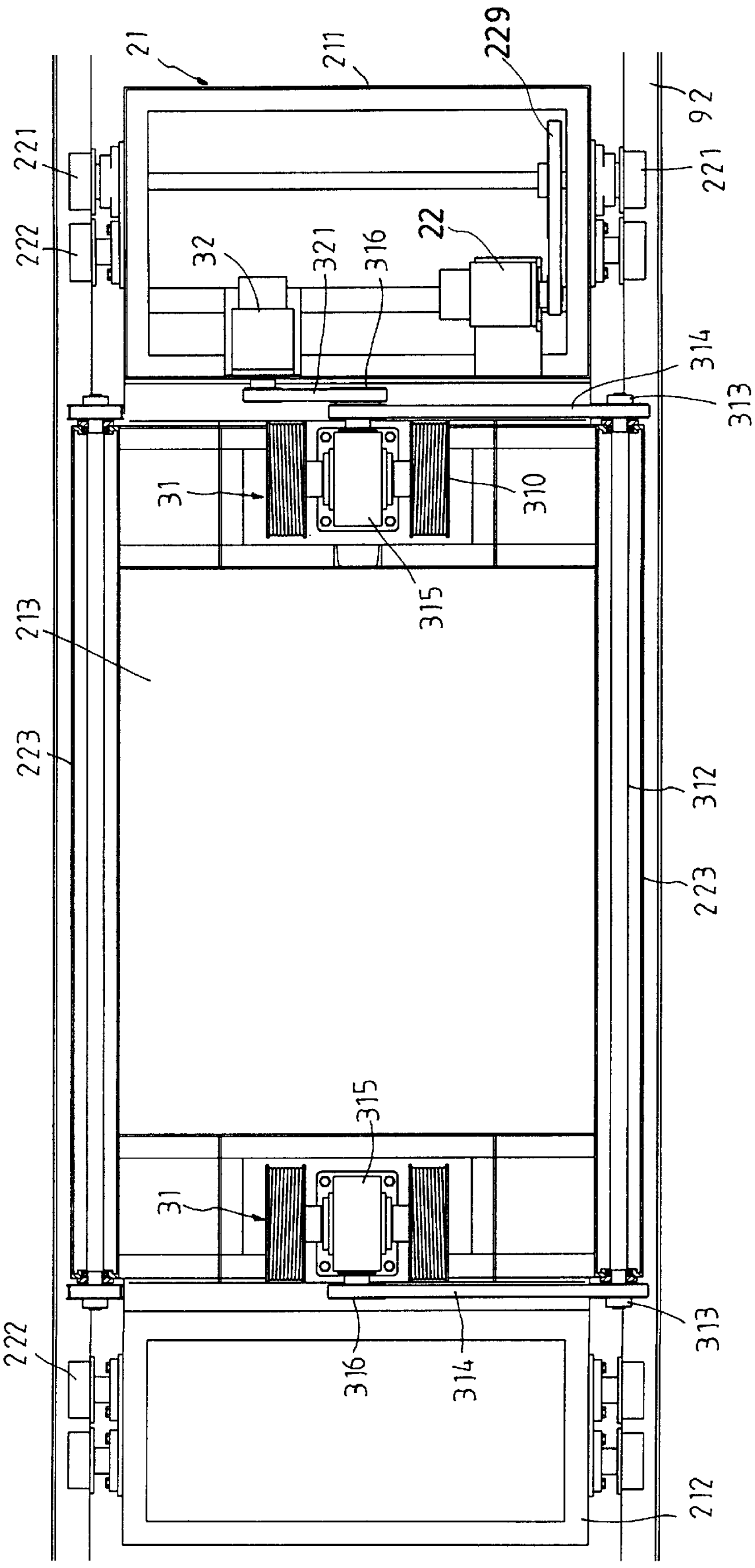
FIG. 4 is a cross-sectional view taken along the lines IV—IV in FIG. 2.

Referring to FIGS. 2, 3 and 4, the translation device 2 includes a base 21 that is connected slidably to the horizontal guide rails 92, and a driving motor 22 fixed on the base 21 to drive the base 21 to move relative to the horizontal guide rails 92. The base 21 has a first support body 211, a second support body 212, and two connection members 223 interconnecting the first and second support bodies 211, 212. The first and second support bodies 211, 212 confine a receiving space 213 to receive the first and second elevator devices 3, 4. The driving motor 22 is fixed on the first support body 211. A rotary shaft 220 is disposed rotatably on the first support body 211 and can be rotated by the driving motor 22 via a belt member 229. Two drive rollers 221 are connected to two ends of the rotary shaft 220. A plurality of driven rollers 222 are provided on the first and second support bodies 211, 212. The drive rollers 221 and the driven rollers 222 are received in the horizontal guide rails 92.

In addition, the first elevator device 3 includes two first reel units 31 mounted respectively on the first and second support bodies 211, 212, a first motor fixed on the first support body 211 for driving the first reel units 31 synchronously, an upper frame 34, a lower frame 34, and two vertical guide frames 30. Each of the vertical guide frames is formed with inner and outer rails 35, 36. Each of the first reel units 31 has two first reels 310, two first ropes 311 wound around the first reels 310, and a worm speed-reducer 315 fixed to a respective one of the first and second support bodies 211, 212. Each of the first ropes 311 has a first end connected to a corresponding one of the first reels 310, and a second end connected to the lower frame 34. The worm speed-reducer 315 of each of the first reel units 31 has a belt pulley 316 connected thereto. The worm speed-reducer 315 on the first support body 211 can be driven by the first motor 32 to rotate the first reels 310 on the first support body 211. In addition, each of the connection members 223 has a transmission shaft 312 journalled therein. The transmission shaft 312 of each of the connection members 223 has two transmission wheels 313. Two transmission belts 314 interconnect respectively the belt pulleys 316 and the transmission wheels 313. Moreover, the upper and lower frames 33, 34 and the vertical guide frames 30 are located in the aisle 91 between two rack members 9, as shown in FIG. 1. The outer rails 36 of the vertical guide frames 30 engage a plurality of rollers 224 provided on the first and second support bodies 211, 212. As such, the vertical guide frames 30 can slide with respect to the base 21.

Referring to FIG. 2, the second elevator device 4 has two second reel units 41 disposed respectively on the first and second support bodies 211, 212, a second motor 42 fixed on the first support body 211 for driving the second reel units 41 synchronously, a slider 43 mounted slidably on the vertical guide frames 30 between the inner rails 35, and pulleys 44 disposed rotatably on the upper frame 33. Each of the second reel units 41 has two second reels 410, and two second ropes 411 wound around the second reels 410 and passing over the pulleys 44, respectively. Each of the second ropes 411 has a first end connected to the slider 43 and a second end connected to a corresponding one of the second reels 410. The slider 43 has a plurality of guide rollers 412 provided on an edge thereof and received in the inner rails 35. Moreover, a guide member 341 is disposed on the lower frame 34.

Figure 5:
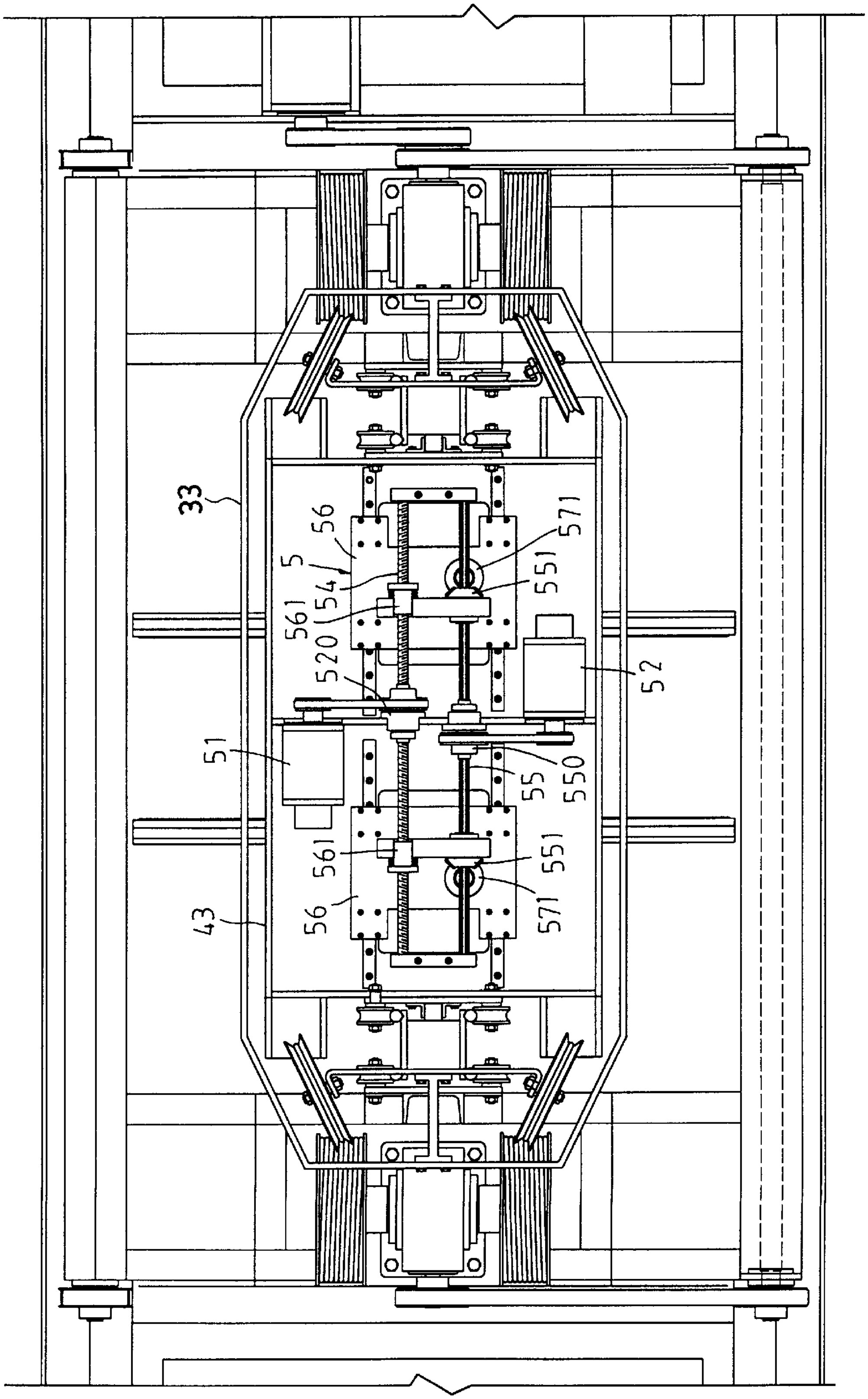
FIG. 5 is a fragmentary enlarged top view of the preferred embodiment.
Figure 6:
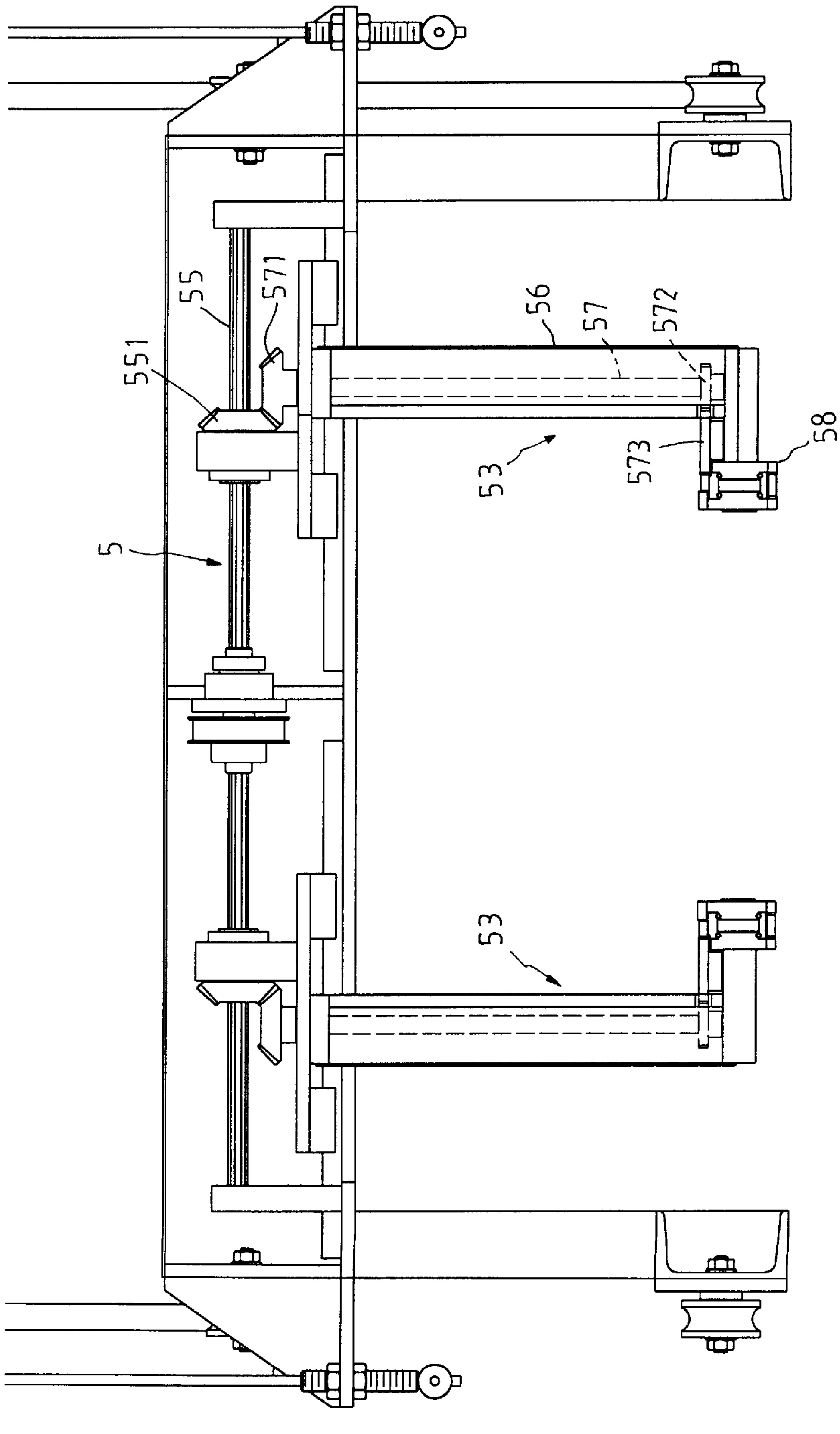
FIG. 6 is an enlarged side view of holding means of the preferred embodiment according to the present invention.

Referring to FIGS. 5 and 6, the holding means 5 includes a first driving motor 51 fixed on the slider 43, a second driving motor 52 fixed on the slider 43, and two clamping devices 53 driven by the first and second driving motors 51, 52 to move toward and away from one another. Each of the clamping devices 53 includes a threaded rod 54 disposed on the slider 43 and rotatable by the first driving motor 51, a spline shaft 55 disposed on the slider 43 and rotatable by the second driving motor 52, an upright clamping arm 56 mounted slidably on the slider 43 at an upper end portion thereof, a guide rod 57 extending vertically through the clamping arm 56, and a horizontal support unit 58 connected to a lower end portion of the clamping arm 56. The threaded rods 54 on the clamping devices 53 have threads that extend in opposite directions. The upper end of each of the clamping arms 56 is formed as a plate, and has a nut member 561 fixed thereto and engaging a corresponding one of the threaded rods 54.

Figure 7:
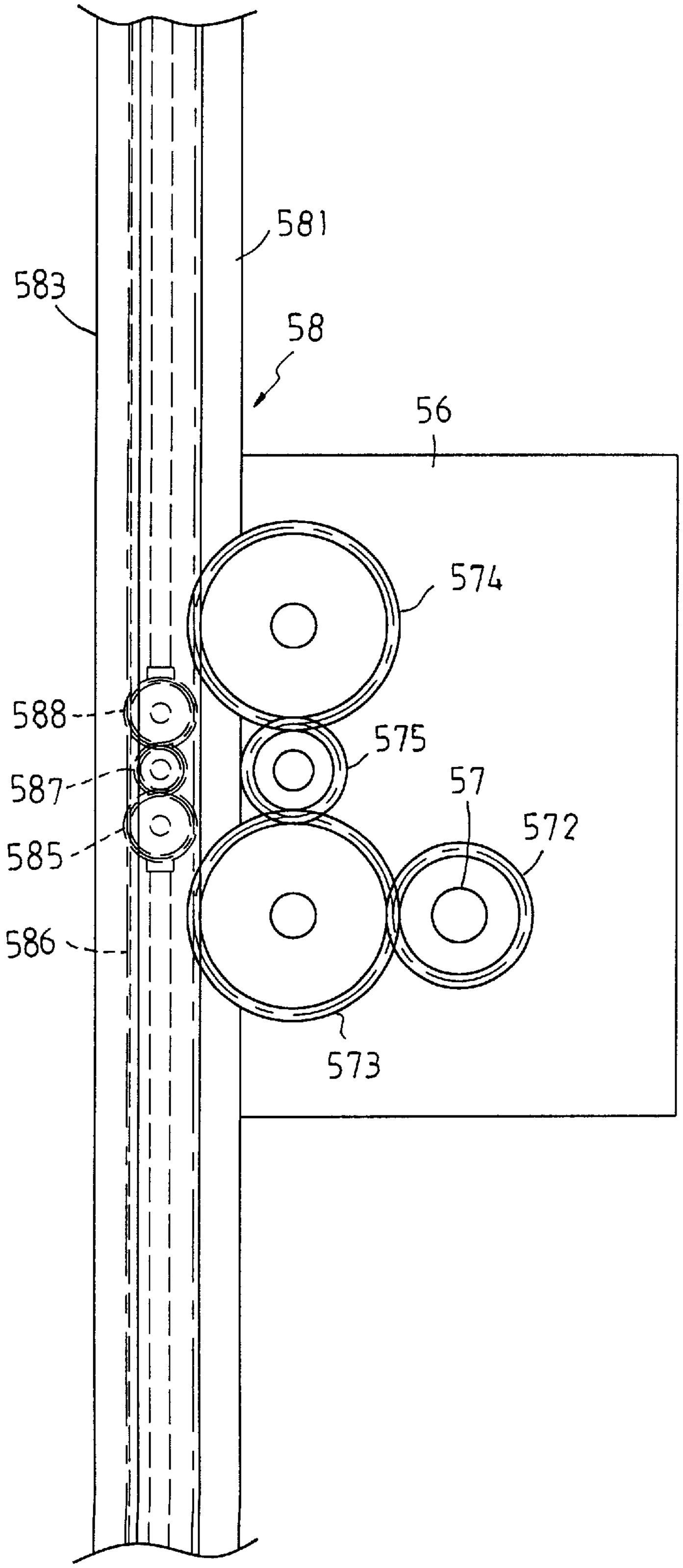
FIG. 7 is a top view of a support unit of the preferred embodiment.

Referring to FIGS. 6 and 7, the upper end portion of each of the clamping arms 56 has a first bevel gear 551 that is sleeved on a corresponding one of the spline shafts 55. Each of the guide rods 57 has a second bevel gear 571 and a first transmission gear 572 provided respectively on two ends thereof. The second bevel gears 571 engage the first bevel gears 551. The lower end portion of each of the clamping arms 56 has a second transmission gear 573 connected to the first transmission gear 572, a third transmission gear 574, and an idle gear 575 interconnecting the second and third transmission gears 573, 574. The first transmission gears 572 are connected to and are rotatable via the guide rods 57.

Figure 8:
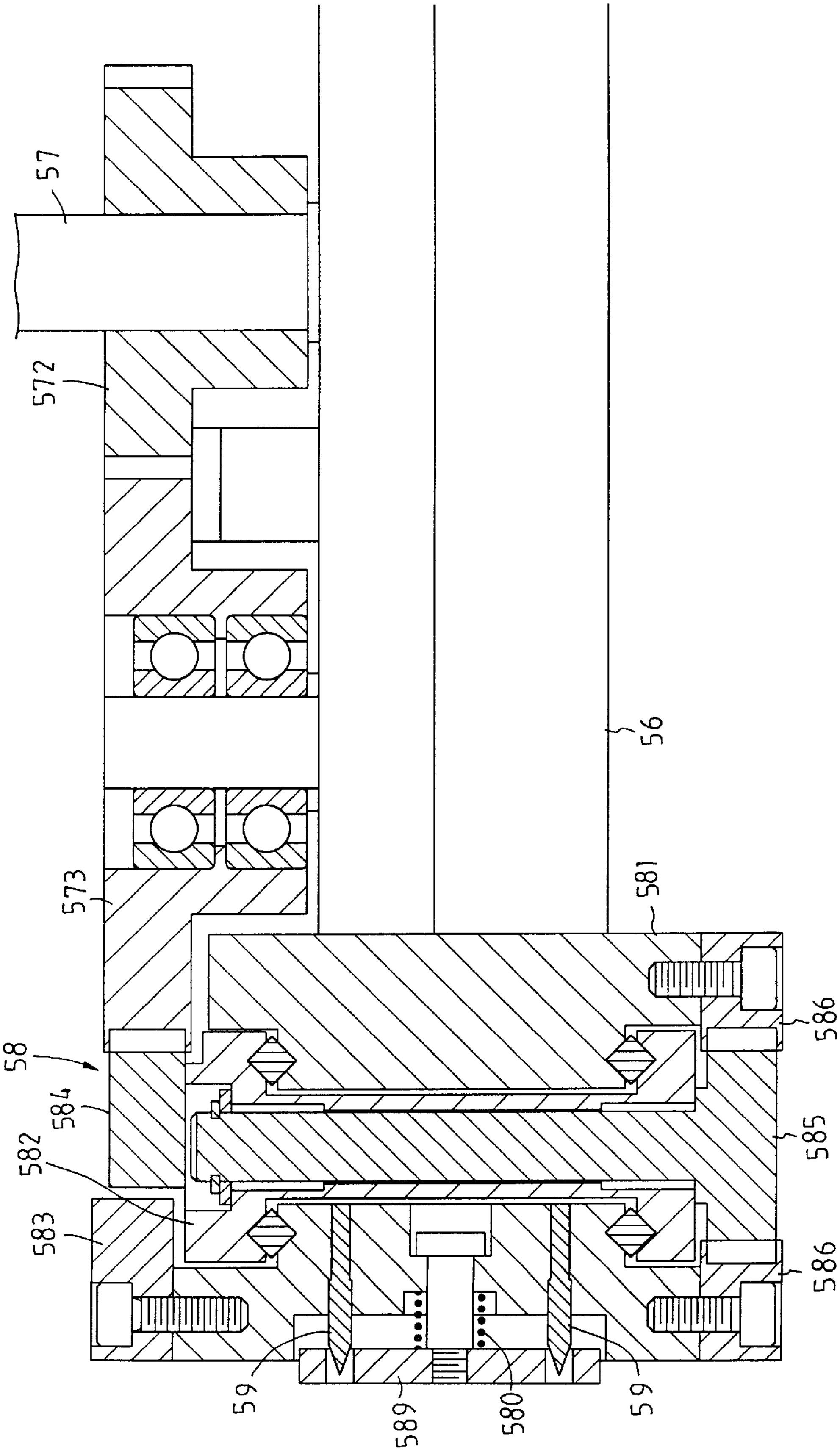
FIG. 8 is a fragmentary enlarged cross-sectional view of the support unit of the preferred embodiment.

Referring to FIGS. 7 and 8, each of the support units 58 has a first elongated plate 581 extending perpendicularly from a respective one of the lower end portions of the clamping arms 56 in a second direction transverse to the first direction, a second elongated plate 582 connected to the first elongated plate 581 and slidable relative to the first elongated plate 581 in the second direction, and a third elongated plate 583 connected to the second elongated plate 582 and slidable relative to the second elongated plate 582 in the second direction. The third elongated plate 583 of each of the support units 58 has a plurality of positioning members 59, and a movable plate 589 connected to and slidable with respect to the positioning members 59 in a direction parallel to the first direction. The movable plate 589 of the third elongated plate 583 of each of the support units 58 is spring-biased by a spring 580 to move away from and offset to the third elongated plate 583. Each of the second elongated plates 582 has a gear rack 584 that engages the second transmission gear 573, a first gear 585 that is rotatable when the second elongated plate 582 moves, as best illustrated in FIG. 7, a second gear 588, and a second idle gear 587 interconnecting the first gear 585 and second gear 588. In addition, each of the first and third elongated plates 581, 583 has a gear rack 586 that engages the first gear 585.

Referring back to FIG. 4, when the driving motor 22 is actuated, the rotary shaft 220 is rotated via the belt member 229. The driving roller 221 is then rotated to move the first and second support bodies 211, 212 along the horizontal guide rails 92. That is, the conveying device 1 can be moved along the horizontal guide rails 92.

Referring to FIGS. 2 and 4, when the first motor 32 is actuated, one of the first reels 310 on the first support body 211 is rotated via a belt 321 that is connected to the first motor 32 and the belt pulley 316 of one of the worm speed-reducers 315 on the first support body 211. Meanwhile, since the transmission belts 314 are connected to the transmission wheels 313, the other one of the first reels 310 on the second support body 212 is rotated synchronously via the belt pulley 316 and the other one of the worm speed-reducers 315 on the second support body 212. As such, the vertical guide frames 30 can be moved upwardly and downwardly relative to the base 21 by winding and unwinding the first ropes 311 on the first reels 310.

Likewise, the second reels 410 can be rotated by the second motor 42 to move the slider 43 upwardly and downwardly along the vertical guide frames 30.

Figure 9:
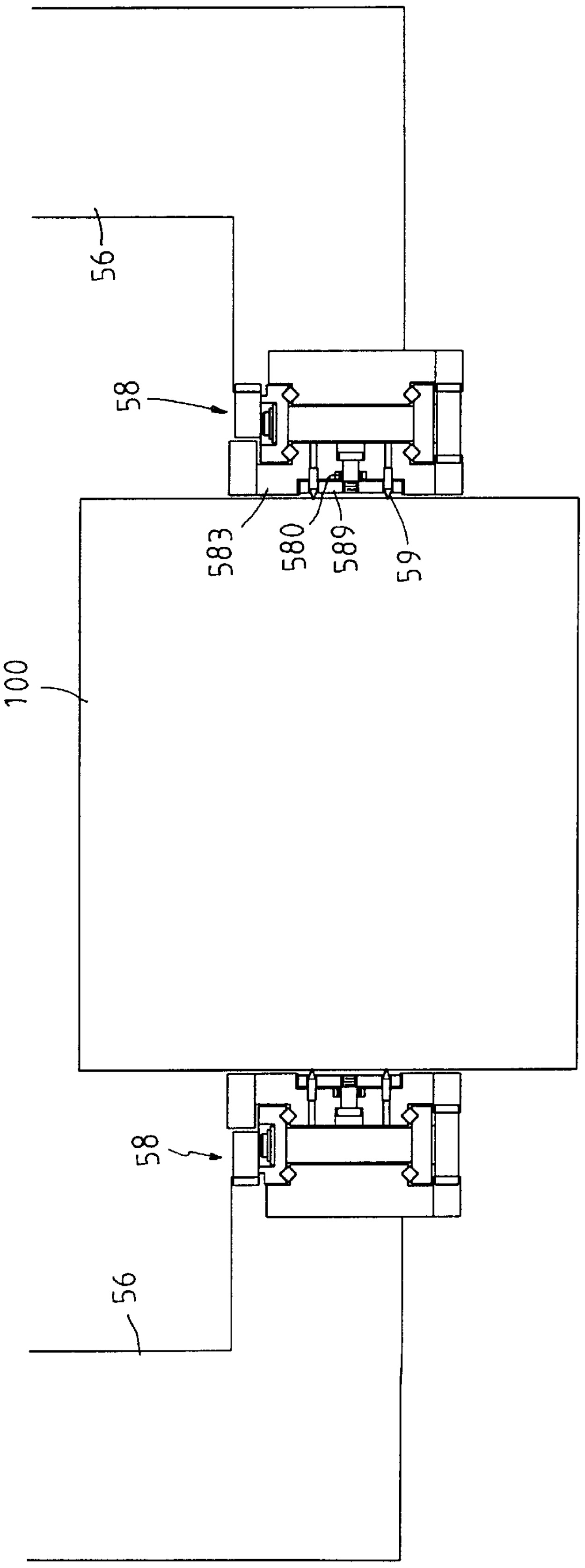
FIG. 9 is a schematic view illustrating clamping devices of the preferred embodiment when in a first operative position.
Figure 10:
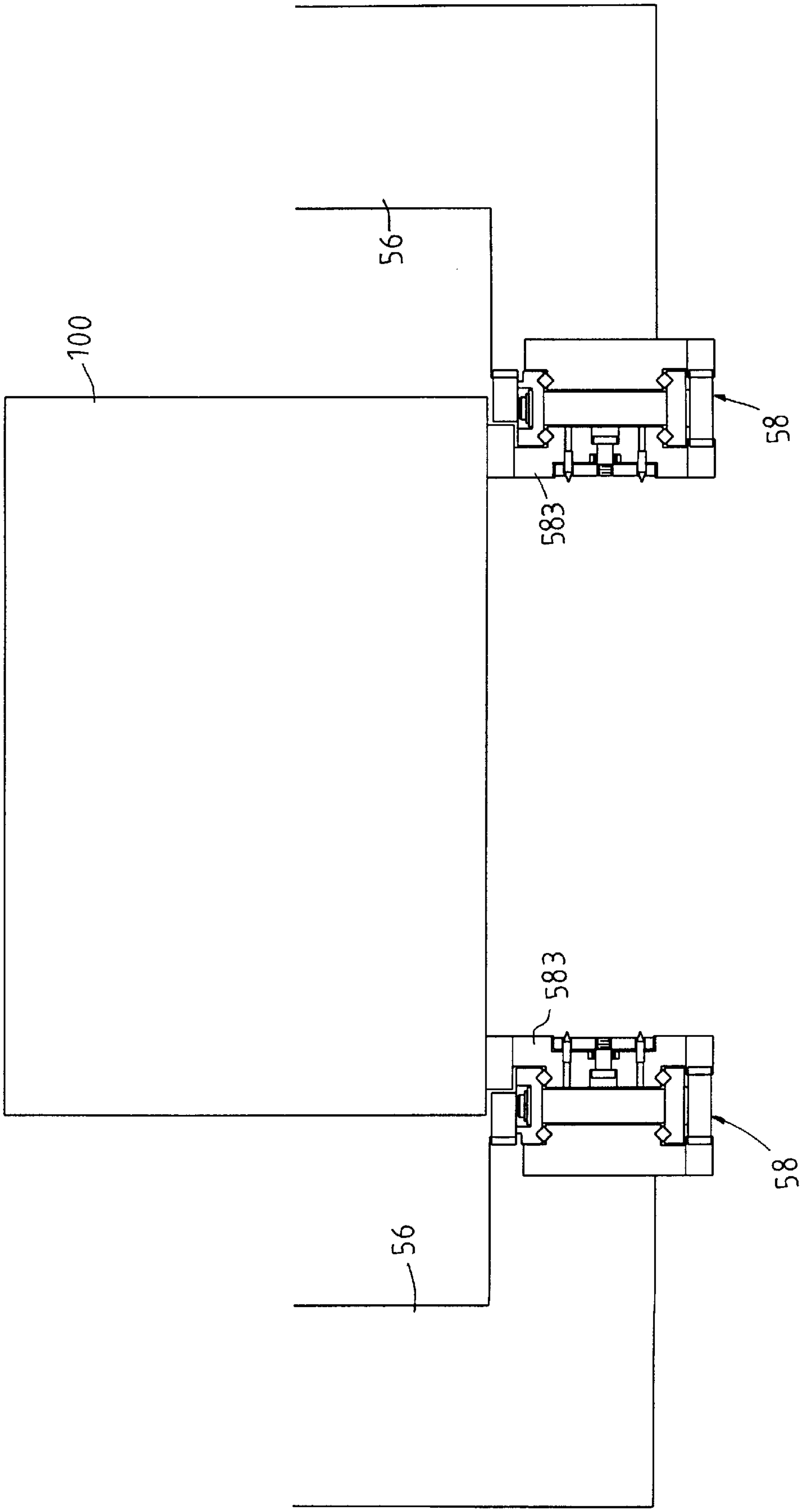
FIG. 10 is a schematic view illustrating the clamping devices of the preferred embodiment when in a second operative position.

Referring to FIGS. 5, 6, 8 and 9, when it is desired to clamp an article 100 by the holding means 5, the first driving motor 51 is actuated to drive a driven wheel 520 fixed on the threaded rods 54 in order to rotate the threaded rods 54. The clamping arms 56 are moved with the nut members 561 relative to the slider 43. At this time, the first bevel gears 551 are moved relative to the spline shafts 55. As such, the support units 58 can be moved toward one another. When the article 100 is clamped by the third elongated plates 583, the movable plates 589 are compressed against the springs 580 by the article 100 to permit exposure of the positioning members 59, which in turn position firmly the article 100 between the clamping arms 56, as best illustrated in FIG. 9. Alternatively, if the article 100 is relatively huge or heavy, the article 100 is disposed on and is supported by the top edges of the third elongated plates 583. Therefore, holding means 5 can be used to clamp or support the article 100 when conveying the same.

Figure 11:
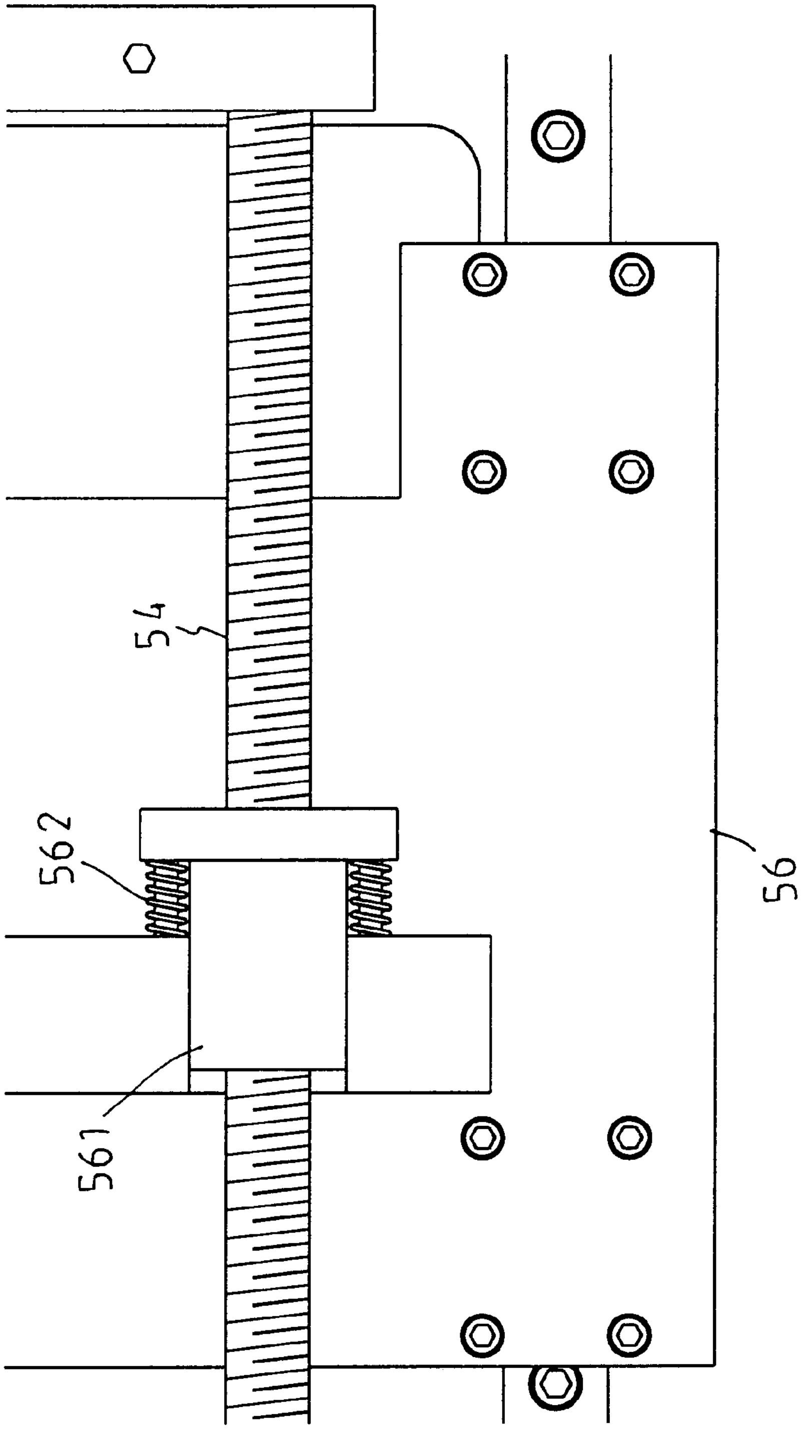
FIG. 11 is a fragmentary enlarged top view of the clamping devices of the preferred embodiment.

Referring to FIGS. 9 and 11, since the third elongated plates 583 are driven by the threaded rods 54 and the nut members 561, excessive force may be exerted onto the article 100 by the third elongated plates 583. To avoid this, compression springs 562 are provided on the nut members 561 to buffer the movement of the clamping arms 56.

Figure 12:
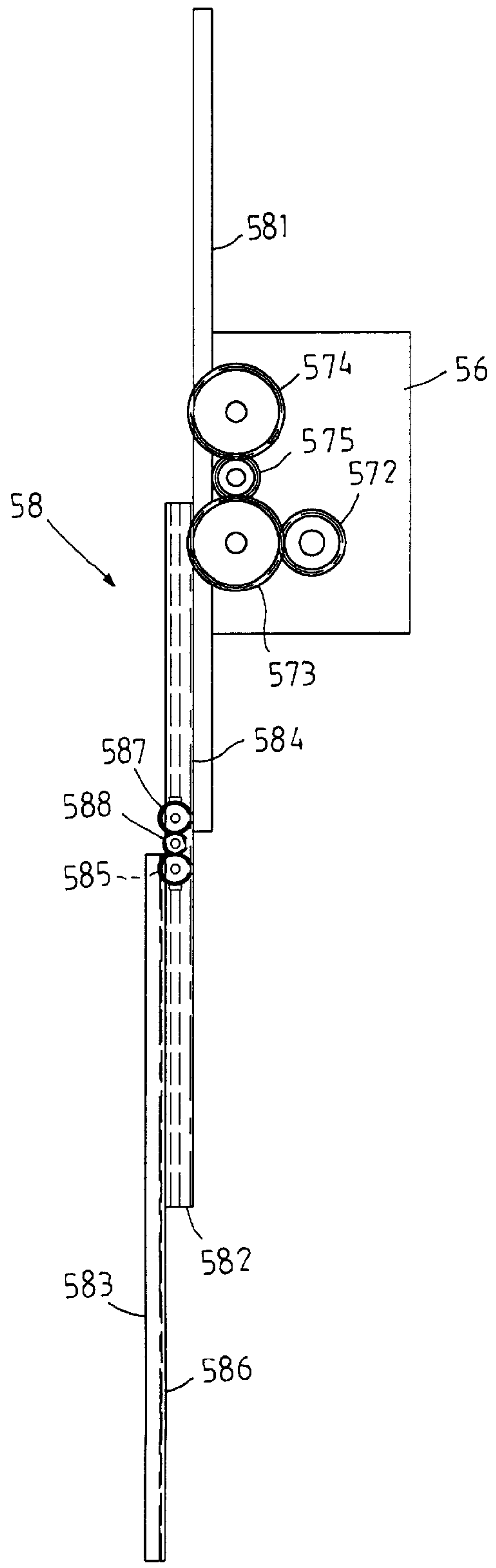
FIG. 12 illustrates the support unit of the preferred embodiment when in an extended position.

Referring to FIG. 12 and FIGS. 5 and 6, when it is desired to extend the third elongated plates 583 to clamp an article, the second driving motor 52 is actuated to drive a driven wheel 550 that is connected to the spline shafts 55 to rotate the spline shafts 55. The guide rods 57 are then rotated via the first and second bevel gears 551, 571. The first transmission gears 572 rotate to drive the gear racks 584 via the second transmission gears 573. As such, the second elongated plates 582 can be moved to extend from the support units 58. The movement of the second elongated plates 582 rotates the first gears 585, which in turn moves the gear racks 586. As such, the third elongated plates 583 can be moved to extend from the second elongated plates 582, as best illustrated in FIG. 12. Moreover, the second gears 587 and the third transmission gears 574 can increase the stroke of the second and third elongated plates 582, 583.

Figure 13:
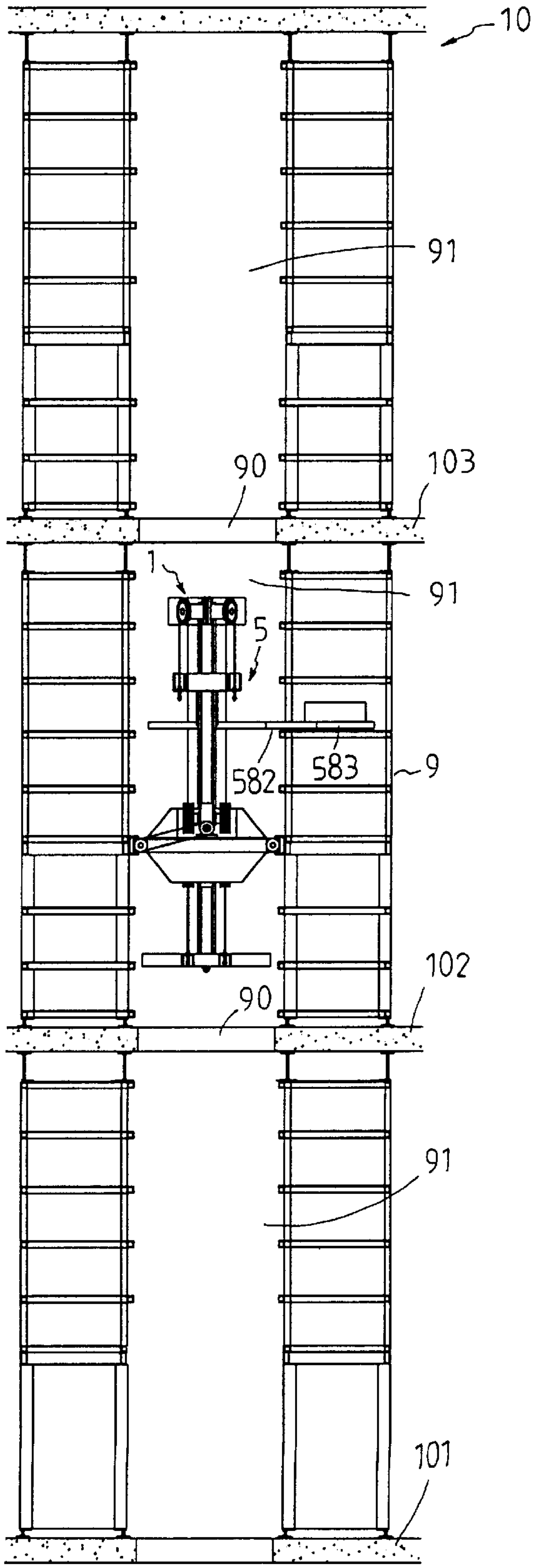
FIG. 13 illustrates the preferred embodiment of the warehousing system when in a first operative position.

Referring to FIG. 13, the holding means 5 can extend into the rack members 9 via the second and third elongated plates 582, 583 to clamp or support the article to be conveyed.

Figure 14:
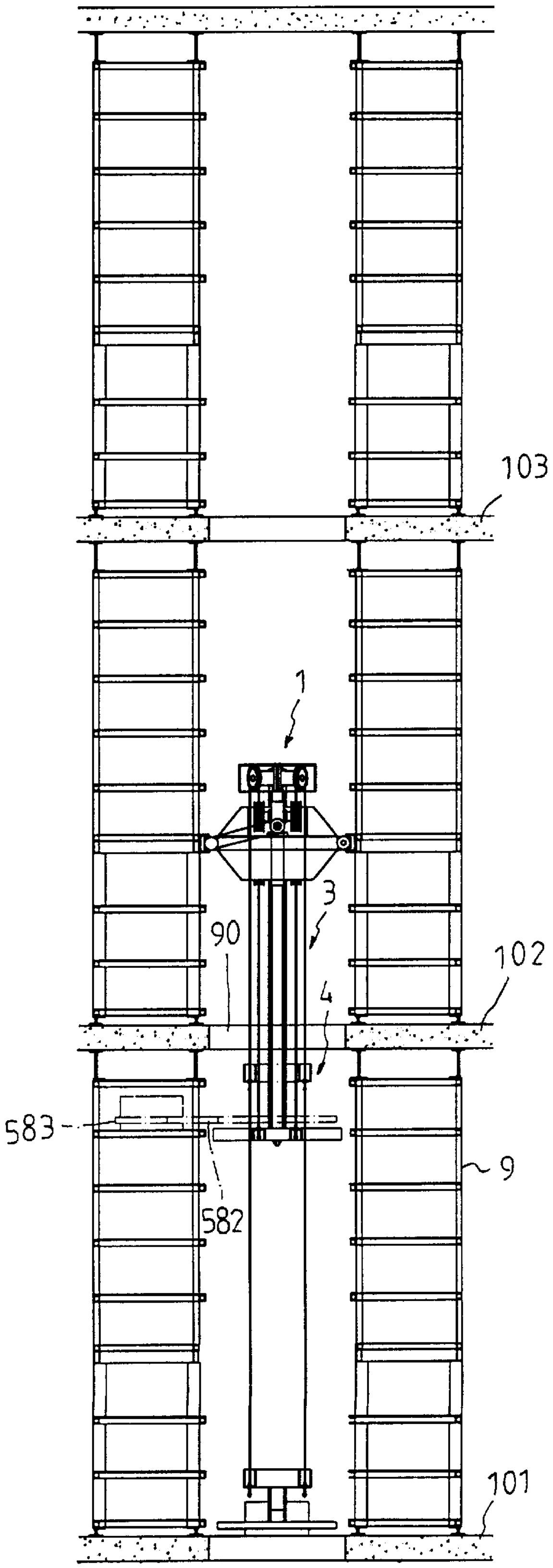
FIG. 14 illustrates the preferred embodiment of the warehousing system when in a second operative position.

Referring to FIG. 14, first and second elevator devices 3, 4 of the conveying device 1 can extend through the hole 90 in the second floor 102 to hold an article on the first floor 101 via the holding means 5. Then, the article can be transferred to any one of the levels in the rack members 9 via the second and third elongated plates 582, 583.

Figure 15:
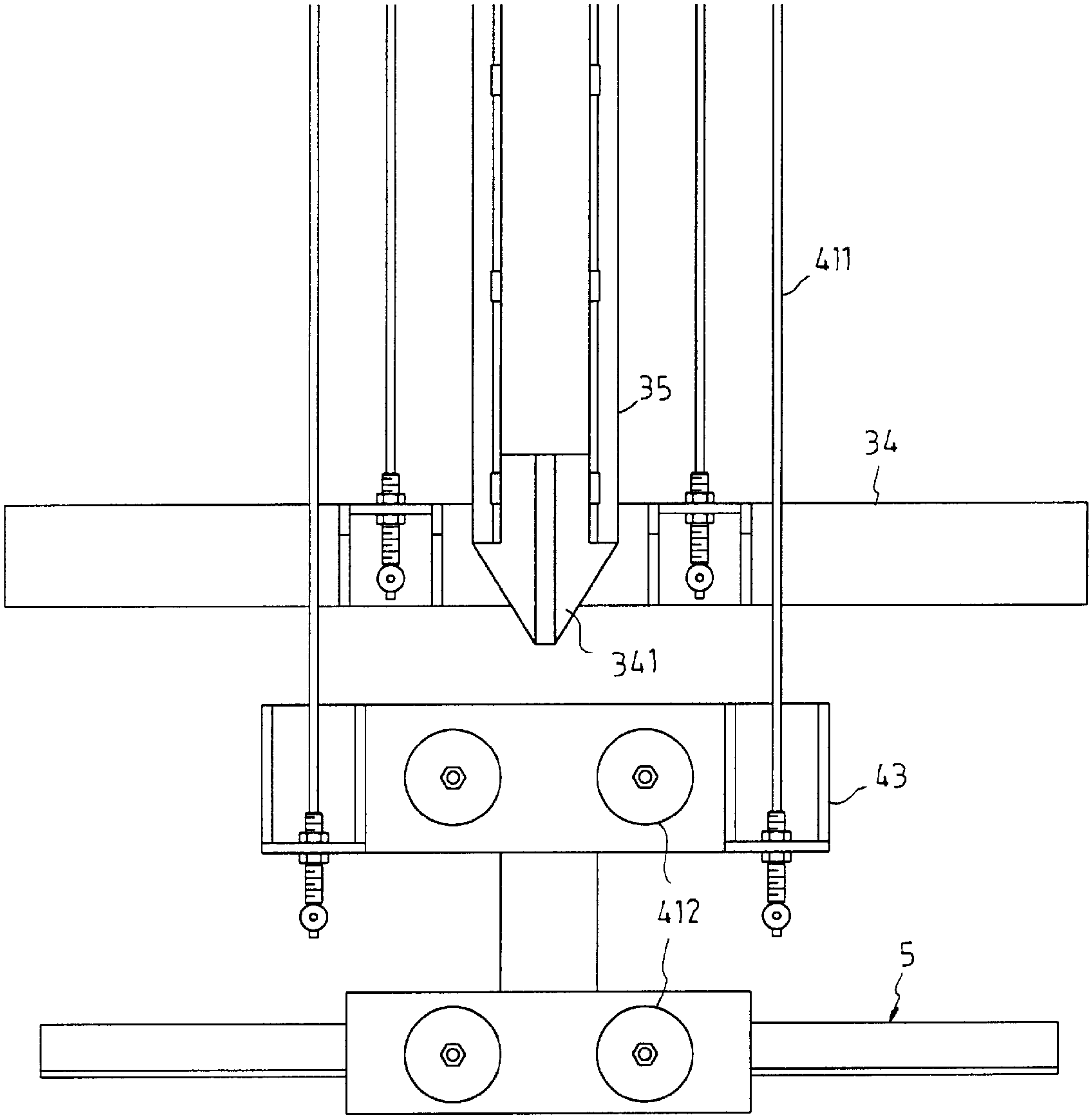
FIG. 15 is an enlarged view of a part of a raising and lowering means of the preferred embodiment of the warehousing system according to the present invention.

Referring to FIG. 15, when the slider 43 of the second elevator device 4 is moved upwardly from a position outside the vertical guide frames 30, the guide member 341 guides the slider 43 into the inner rails 35 of the vertical guide frames 30.

Figure 16:
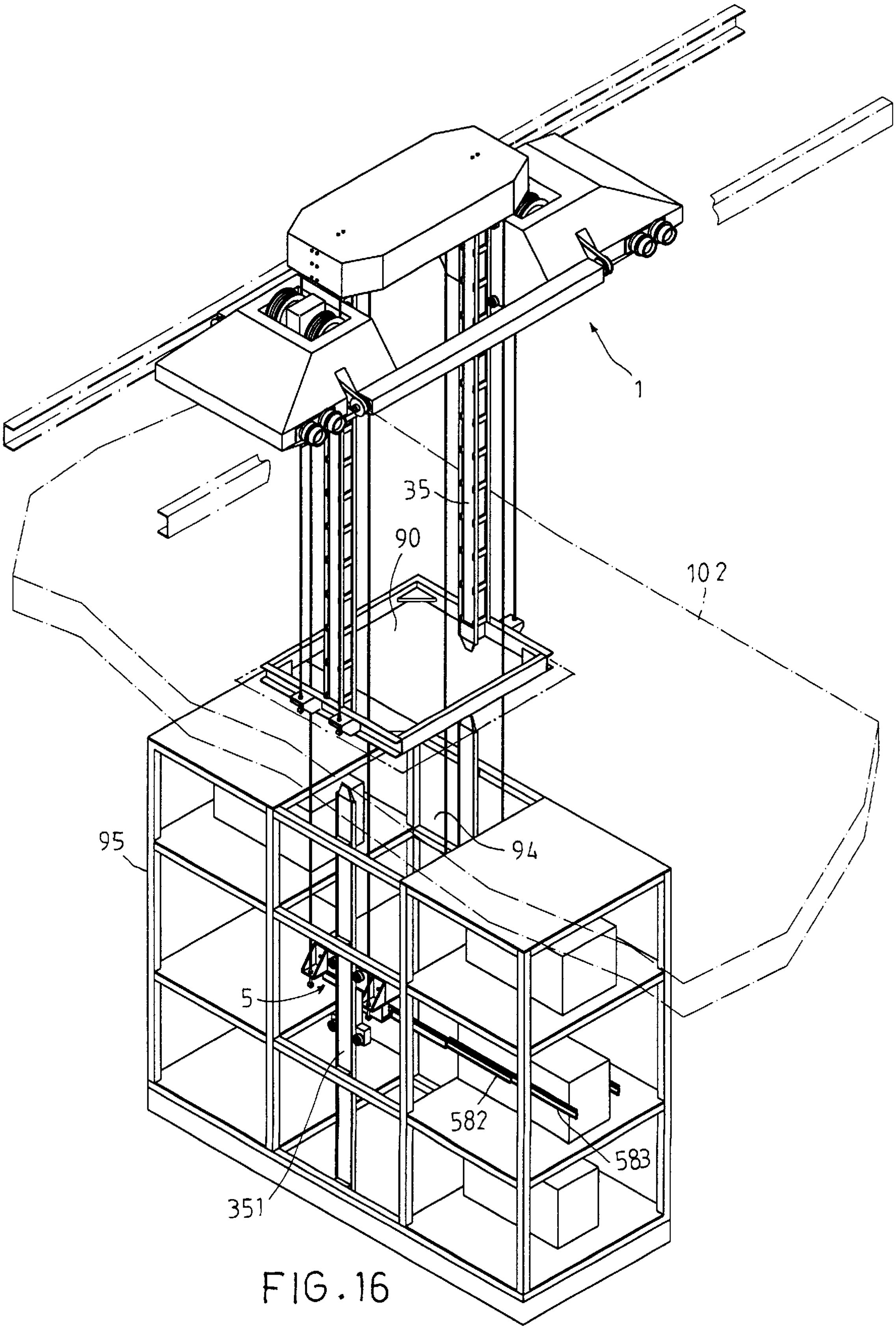
FIG. 16 is a perspective view illustrating a second preferred embodiment of a warehousing system according to the present invention.

FIG. 16 shows a second preferred embodiment of a warehousing system according to the present invention. As shown, for some processing, manufacturing factories, the first floor is sometimes employed to store articles while the processing, manufacturing processes are carried out on the second floor or other upper floors. In this case, the conveying device 1 can be employed to hold and transfer the articles that are disposed on a rack member 95. The rack member 95 is disposed on the first floor and has a vertical hole 94 that corresponds to the hole 90 in the second floor 102, and an opposed pair of vertical guide rails 351 installed in the vertical hole 94. As such, the holding means 5 can be guided by the guide rails 351 when it moves down from the inner rails 35 and passes through the hole 90 and the through hole 94 in the rack member 95. The second and third elongated plates can then be employed to clamp or support the article on the rack member 95.

Figure 17:
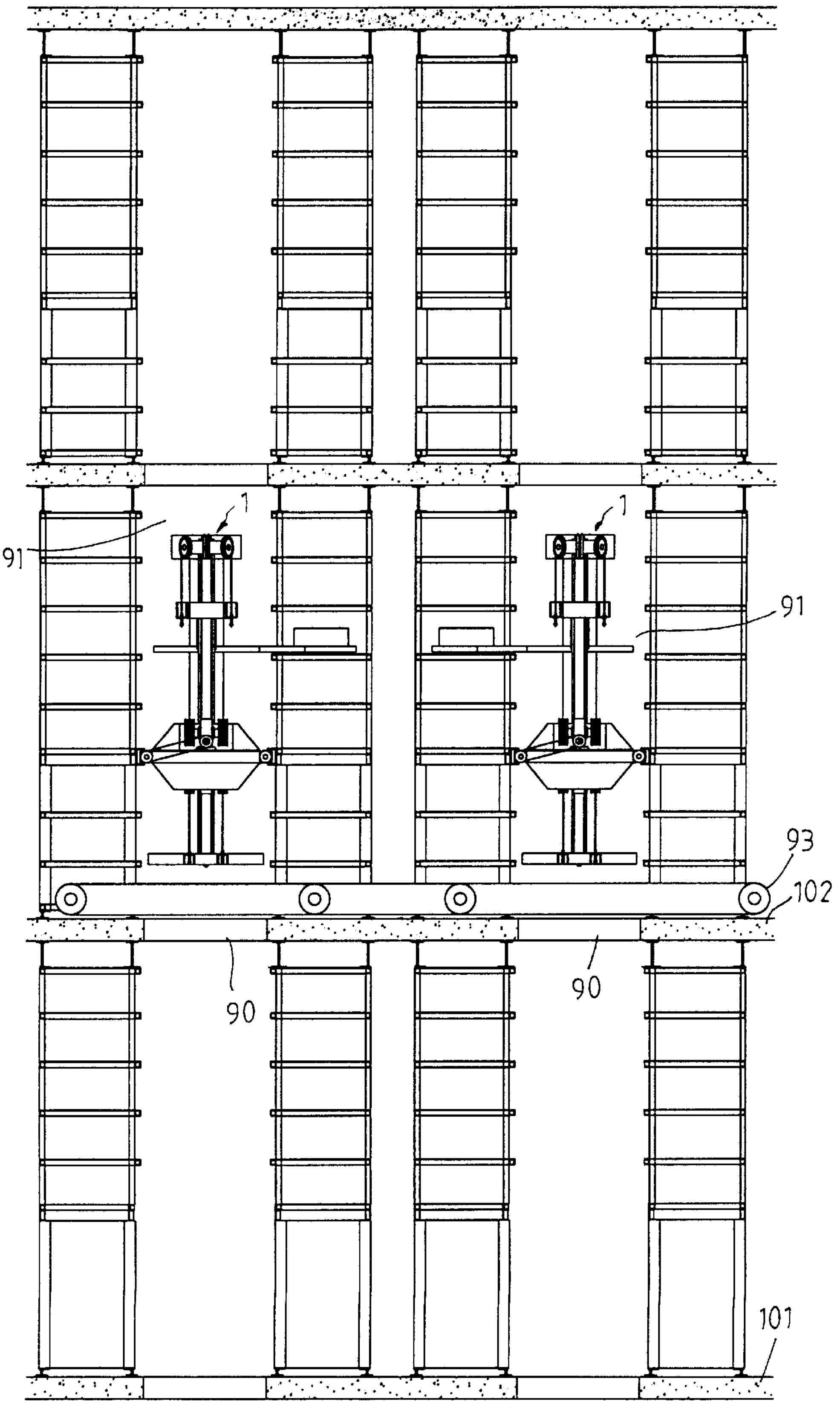
FIG. 17 is a schematic view of a third preferred embodiment of a warehousing system according to the present invention.

FIG. 17 shows a third preferred embodiment of a warehousing system according to the present invention. In this embodiment, two conveying devices 1 are installed in the aisles 91 on the second floor 102. An article can be transferred from one aisle 91 to another aisle 91 on the second floor 102 by means of a belt conveyor 93 in order to facilitate the transportation of the articles in the building 10.

Figure 18:
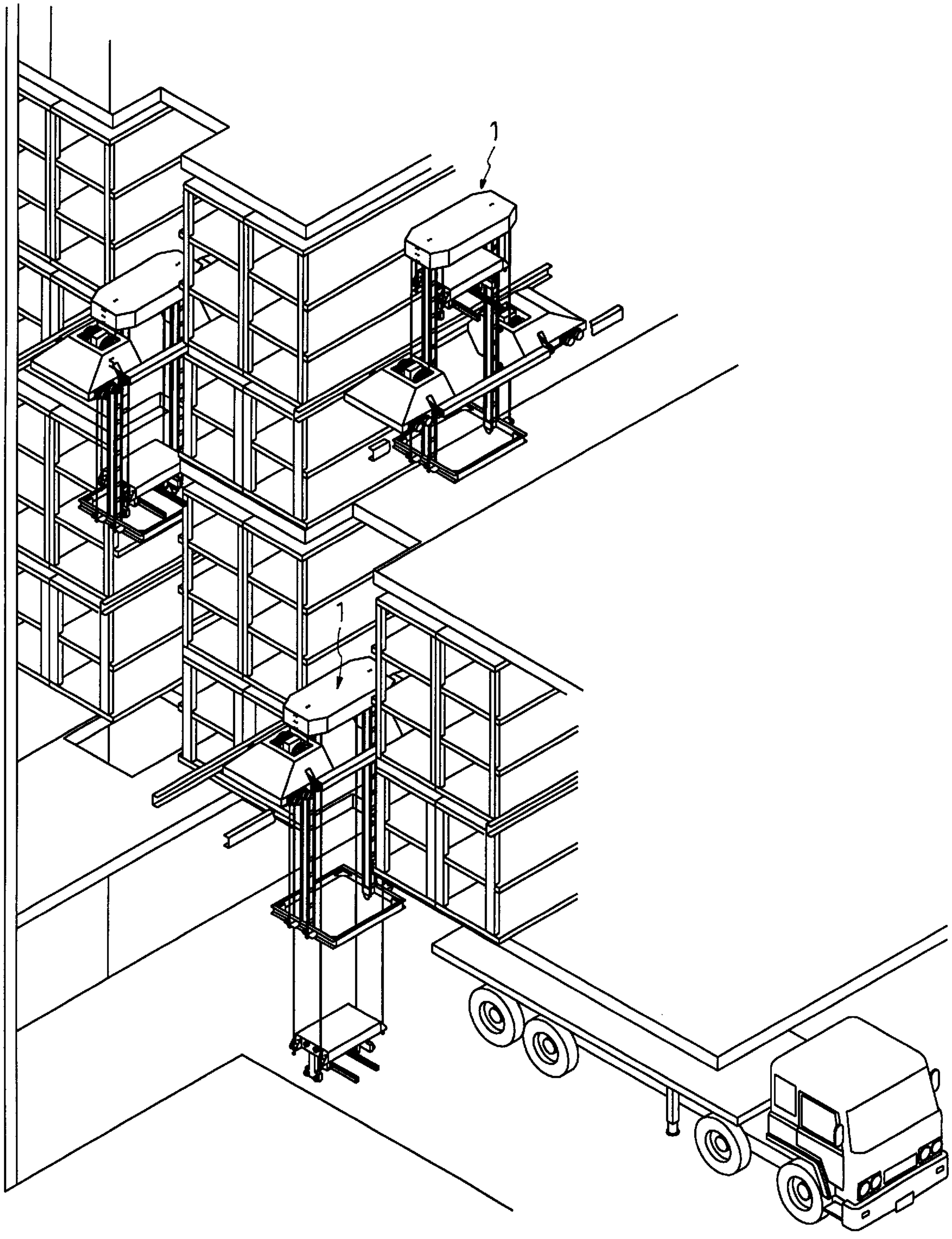
FIG. 18 is a schematic view illustrating a fourth preferred embodiment of a warehousing system according to the present invention.

FIG. 18 shows a fourth preferred embodiment of a warehousing system according to the present invention. In this embodiment, the article on the second floor or other upper floors can be transferred to a truck on the first floor for transportation purposes.

The advantages of the warehousing system of the present invention are as follows:

1. An article on a lower floor can be held and conveyed by the conveying device on an upper floor. That is, the article can be conveyed between two adjacent levels of a multistory building by a single conveying device. Therefore, the conveying efficiency can be dramatically improved in a multistory building.

2. Since the conveying device of the present invention can be employed to transfer an article between two adjacent levels of a multistory building, no transportation rails and additional elevators are required. The available storage space and area in the warehousing system are greater than those in the aforementioned conventional warehousing system.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. A warehousing system comprising a multistory building having at least one lower floor, at least one upper floor located above said lower floor, opposed pairs of rack members disposed on said upper floor, an aisle formed between each of said pairs of said rack members, each pair of said rack members having two opposed horizontal guide rails respectively formed thereon at two sides of said aisle, a hole formed in said upper floor at said aisle to intercommunicate respectively with said lower floor, and a conveying device disposed movably on said horizontal guide rails, said conveying device including a translation device having a base bridging said aisle and connected slidably to said horizontal guide rails, driving means disposed on said base for driving said base to move along said horizontal guide rails in a first direction, holding means mounted on said base and adapted for holding an article to be conveyed, and elevator means disposed on said base for raising and lowering said holding means from said base, said elevator means being movable relative to said base to lower said holding means through said hole into said lower floor.

2. The warehousing system as claimed in claim 1, wherein said elevator means includes first and second elevator devices both of which are mounted movably on said base, said holding means being mounted movably on said second elevator device, said first elevator device being movable upward and downward relative to said base, said holding means being movable downward relative to said first elevator device.

3. The warehousing system as claimed in claim 2, wherein said base includes a pair of support bodies which are disposed adjacent to said horizontal guide rails, respectively, said support bodies confining a receiving space to receive said first and second elevator devices, said first elevator device including two vertical guide frames slidably mounted on said support bodies, respectively.

4. The warehousing system as claimed in claim 3, wherein each of said guide frames includes a pair of vertical outer rails slidably engaging said support bodies, respectively, and a pair of vertical inner rails extending inwardly of said outer rails.

5. The warehousing system as claimed in claim 4, wherein said first elevator unit includes first reel means mounted on said base, first rope means connected to said first reel means and lower ends of said guide frames, and a first motor for driving said first reel means.

6. The warehousing system as claimed in claim 5, wherein said second elevator device includes second reel means mounted on said base, pulley means mounted on said guide frames, a slider mounted slidably on said vertical guide frames between said inner rails, second rope means connected to said second reel means and said slider and passing over said pulley means, and a second motor mounted on said base for driving said second reel means.

7. The warehousing system as claimed in claim 1, wherein said elevator means includes a first elevator device which has a frame structure that includes an upper frame, a lower frame, and two vertical guide frames interconnecting said upper and lower frames and connected slidably to said base, first reel means mounted on said base, first rope means connected to said first reel means and said lower frame, and a first motor for driving said first reel means.

8. The warehousing system as claimed in claim 7, wherein said elevator means further includes a second elevator device which includes second reel means mounted on said base, a slider mounted slidably on said frame structure between the vertical guide frames, second rope means connected to said second reel means and said slider, a second motor mounted on said base for driving said second reel means, and pulley means mounted on said frame structure, said second rope means passing over said pulley means and connected to said slider.

9. The warehousing system as claimed in claim 1, wherein said holding means of said conveying device has two clamping devices, each of said clamping devices having an upper end connected slidably to a slider, and a lower end, said holding means further having means for moving said clamping devices toward and away from one another in a direction parallel to said first direction.

10. The warehousing system as claimed in claim 9, wherein said holding means of said conveying device further has two support units connected respectively to said lower ends of said clamping devices, each of said support units having a first elongated plate extending perpendicularly from a respective one of said lower ends of said clamping devices in a second direction transverse to said first direction, a second elongated plate connected to said first elongated plate and slidable relative to said first elongated plate in said second direction, and a third elongated plate connected to said second elongated plate and slidable relative to said second elongated plate in said second direction, said holding means further having means for moving said second elongated plate relative to said first elongated plate and for moving said third elongated plate relative to said second elongated plate.

11. The warehousing system as claimed in claim 10, wherein said third elongated plate of each of said support units has a plurality of positioning members, and a movable plate connected to and slidable with respect to said positioning members in a direction parallel to said first direction, said movable plate on each of said support units being spring-biased to move away from and offset to said third elongated plate.

* * * * *